M. T. BASCOM.
SEED CORN TESTING APPARATUS.
APPLICATION FILED MAY 20, 1910.

1,007,050.

Patented Oct. 31, 1911.
2 SHEETS—SHEET 1.

M. T. BASCOM.
SEED CORN TESTING APPARATUS.
APPLICATION FILED MAY 20, 1910.

1,007,050.

Patented Oct. 31, 1911.

2 SHEETS—SHEET 2.

Witnesses
F. C. Caswell
Geo. Mankle

Inventor
Maurice T. Bascom
by Walter R. Lane Atty.

UNITED STATES PATENT OFFICE.

MAURICE T. BASCOM, OF ADAIR, IOWA.

SEED-CORN-TESTING APPARATUS.

1,007,050. Specification of Letters Patent. Patented Oct. 31, 1911.

Application filed May 20, 1910. Serial No. 562,528.

*To all whom it may concern:*

Be it known that I, MAURICE T. BASCOM, a citizen of the United States, residing at Adair, in the county of Adair and State of Iowa, have invented a certain new and useful Seed-Corn-Testing Apparatus, of which the following is a specification.

The object of my invention is to provide a seed corn testing apparatus consisting of a germinating device.

More specifically it is my object to provide a germinating apparatus so arranged as to contain a large number of seeds in a comparatively small space and to accurately hold the seeds spaced apart from each other in separate compartments for purposes of identification, and further to provide a device of this kind in which the operator may have ready and free access to all of the seeds contained therein.

Another object is to provide improved means for applying moisture in proper quantities to the germinating device.

A further object is to provide a germinating device of this kind that may be utilized as an ordinary table for various purposes when not being used as a tester so that the device is susceptible of use at all times as a table top and then during the short period of time when seed corn testing is in progress it provides a convenient and easily operated seed corn tester.

Figure 1:
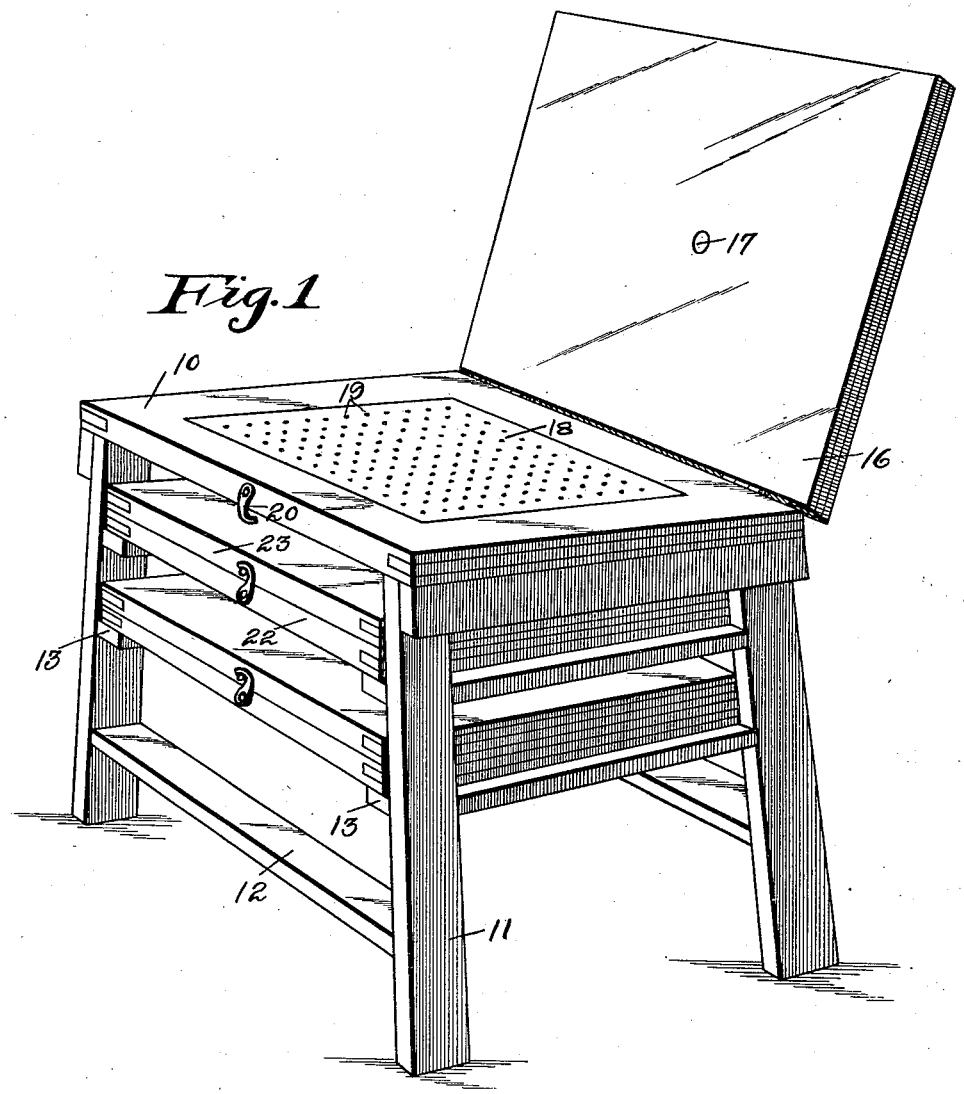
Figure 2:
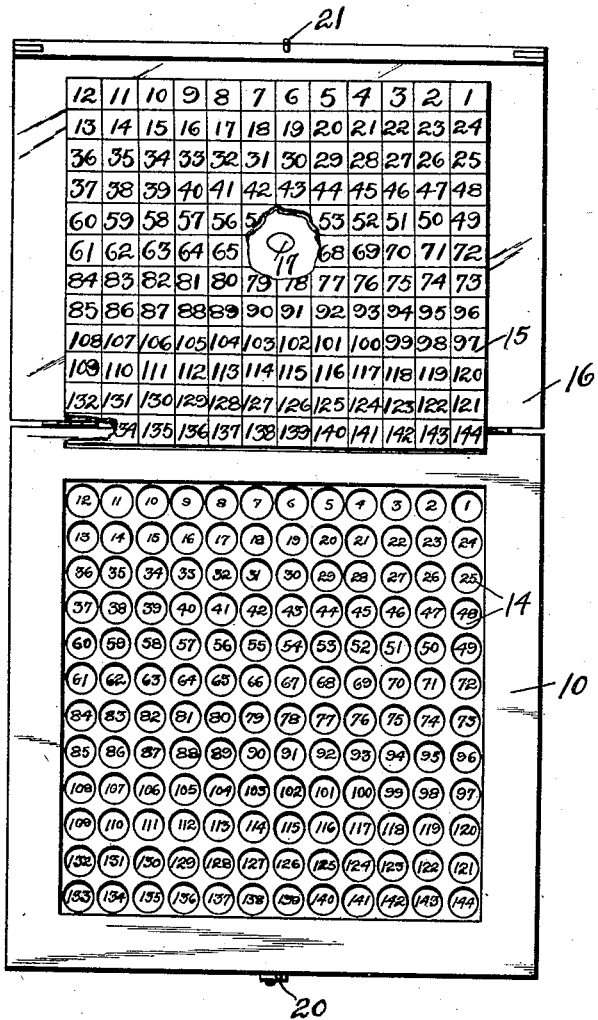
Figure 3:
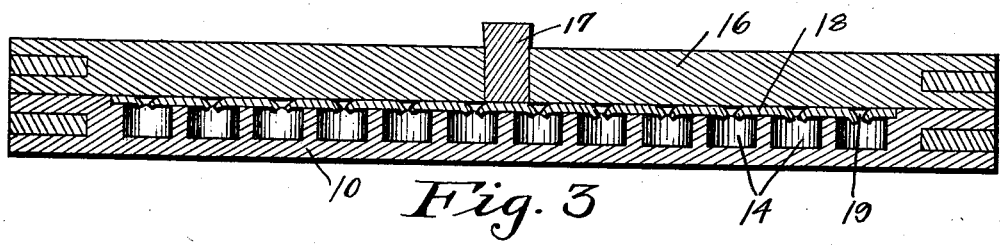

My invention consists in certain details, in the construction, arrangement and combination of the various parts of the device, whereby the objects contemplated are attained, as hereinafter more fully set forth, pointed out in my claims and illustrated in the accompanying drawings, in which:

Figure 1 shows a perspective view of a germinating device embodying my invention with the cover of the upper compartment in open position. Fig. 2 shows a top or plan view of one of the germinating trays with its cover in open position, and Fig. 3 shows a detail, sectional view through one of the germinating trays in closed position.

Referring to the accompanying drawings, my improved germinating device comprises a flat table top 10, having supporting legs 11 connected therewith and provided with suitable braces 12 and guide bars 13. In the table top 10 at its central portion is a rectangular depression and in this depression is a series of round recesses 14 arranged in rows both longitudinally and transversely and extended into the table top a short distance to form seed receptacles, each one being large enough to hold four or five grains of corn. In the bottom of each of said recesses I provide a number, the numbers being consecutively arranged beginning with 1 at the upper right hand corner and then extending consecutively to the left and then down to the second row and then consecutively to the right and so on throughout the entire table top. I also preferably provide a detachable identification card 15 having numbers marked thereon corresponding in arrangement to the numbers in said recesses, which card I preferably support adjacent to the table top to serve as a chart to enable the operator to see the arrangement of the numbers within the recesses when said recesses are filled with corn and the numbers thereby hidden. Hinged to one edge of the table top 10 is a flat cover 16 capable of folding down on top of the table top 10 and preferably provided with a smooth flat top surface to form a table suitable for ordinary use irrespective of its function as a seed tester. In the cover 16 I preferably provide an opening and also a plug 17 for the opening, said plug being removable to permit the operator to pour water into the interior of the germinator.

In order to equally distribute the water throughout the recesses and also to form a substantially air tight seal to prevent evaporation I provide a sheet 18 made of absorbent material such as blotting paper and provided with a series of perforations 19, said perforations being arranged so that one will stand over each of the recesses 14. I also preferably provide a latch device 20 on the table top 10 to engage a pin 21 on the cover 16 whereby the parts may be firmly held together. I also provide a number of germinating devices similar in construction to the table top 10 and cover 16, each of which comprises a lower portion 22 corresponding to the table top 10 and an upper portion 23 corresponding to the cover 16. Each of said germinating devices is of such size and shape that it may be inserted between the supporting legs 11 with its edges resting upon the guide bars 13 so that said germinating devices may be placed in position beneath the table top 10 to thereby occupy a minimum of space and to be readily removable and replaceable. In practical use with this portion of my invention I first remove a number of kernels from each ear of corn to be tested and I place the kernels from each ear in one of the recesses 14. When one of the germinating devices has been filled in this manner I place the absorbent sheet 18 on top of it and then apply water in sufficient quantities to partially fill the recesses 14 and to saturate the absorbent sheet 18. I then close the cover 16 and in this way seal up the germinator so that the moisture will not evaporate too rapidly from the receptacle and the absorbent sheet. After filling the recesses in the table top 10 and closing the cover then the other germinating frames may be successively placed on top of the table and filled and prepared in the same manner and then replaced in position below the table top. The operator may at any time quickly and easily examine the seeds by raising the cover 16 and all or part of the sheet 18 or he may supply moisture to the sheet 18 from time to time by removing the plug 17 and pouring water into the opening which will be taken up by the absorbent sheet and distributed throughout the entire germinating device. After the seeds have remained in the germinator for a sufficient period of time the operator may determine the fertility of all of the seeds by opening the germinator and removing the sheet 18. When this is done it has been found desirable to utilize the card 15 which may be placed in position resting against the raised cover. Assuming for instance that upon such an examination of the seeds it is found that the seeds in the recess No. 10 and those in the recess No. 20 had failed to germinate, by the use of said card the operator may at a glance identify the particular recess by comparing the arrangement of numbers on the card with the arrangement of the recesses in the table top 10 so that without removing the seeds, as would be required in viewing the number in the bottom of the recess, he may determine accurately the number of any particular recess by reference to the card 15 and a comparison of it with the position of the recess in the table top.

I claim as my invention:

1. In a device of the class described, the combination of a germinating body portion having a shallow rectangular depression in its top and also having a series of round recesses in said depression arranged in rows both longitudinally and transversely of the body portion, an absorbent sheet placed in said rectangular depression and extended over said recesses, means for identifying the recesses, and a cover arranged in its closed position to fit against the edges of said body portion surrounding the depression and to cover the entire depression.

2. In a device of the class described, the combination of a germinating body portion and also having a shallow rectangular depression in its top and also having a series of round recesses in said depression arranged in rows both longitudinally and transversely of the body portion, an absorbent sheet placed in said rectangular depression and extended over said recesses, means for identifying the recesses, and a cover arranged in its closed position to fit against the edges of said body portion surrounding the depression and to cover the entire depression, said absorbent sheet being provided with a perforation at each recess and said cover being provided with an opening through which water may be poured to moisten and to plug said opening.

3. In a device of the class described, the combination of a flat table top, said table top having a rectangular depression, and a series of round recesses in said depression arranged in rows longitudinally and transversely, and a flat cover hinged to the table top and designed to fit flat on top of the table top when in its closed position, for the purposes stated.

4. In a device of the class described, the combination of a flat table top, supporting legs connected therewith, said table top having a rectangular depression and a series of round recesses in said depression arranged in rows longitudinally and transversely, a flat cover hinged to the table top and designed to fit flat on top of the table top when in its closed position, guide bars on said legs, and a number of germinating devices, each comprising a flat board having a depression, a series of recesses therein, and a hinged cover connected therewith, each of said germinating devices being detachably mounted upon said guide bars.

Des Moines, Iowa, April 25, 1910.

MAURICE T. BASCOM.

Witnesses:
GEORGE MANKLE,
I. V. CURRAN.

---

Copies of this patent may be obtained for five cents each, by addressing the "Commissioner of Patents, Washington, D. C."